Dec. 28, 1965   R. G. THOMPSON   3,225,789
WATER SOFTENER VALVE

Filed Nov. 13, 1962   2 Sheets-Sheet 1

TO BOTTOM OF MINERAL TANK

INVENTOR.
Richard G. Thompson
BY
Attorney

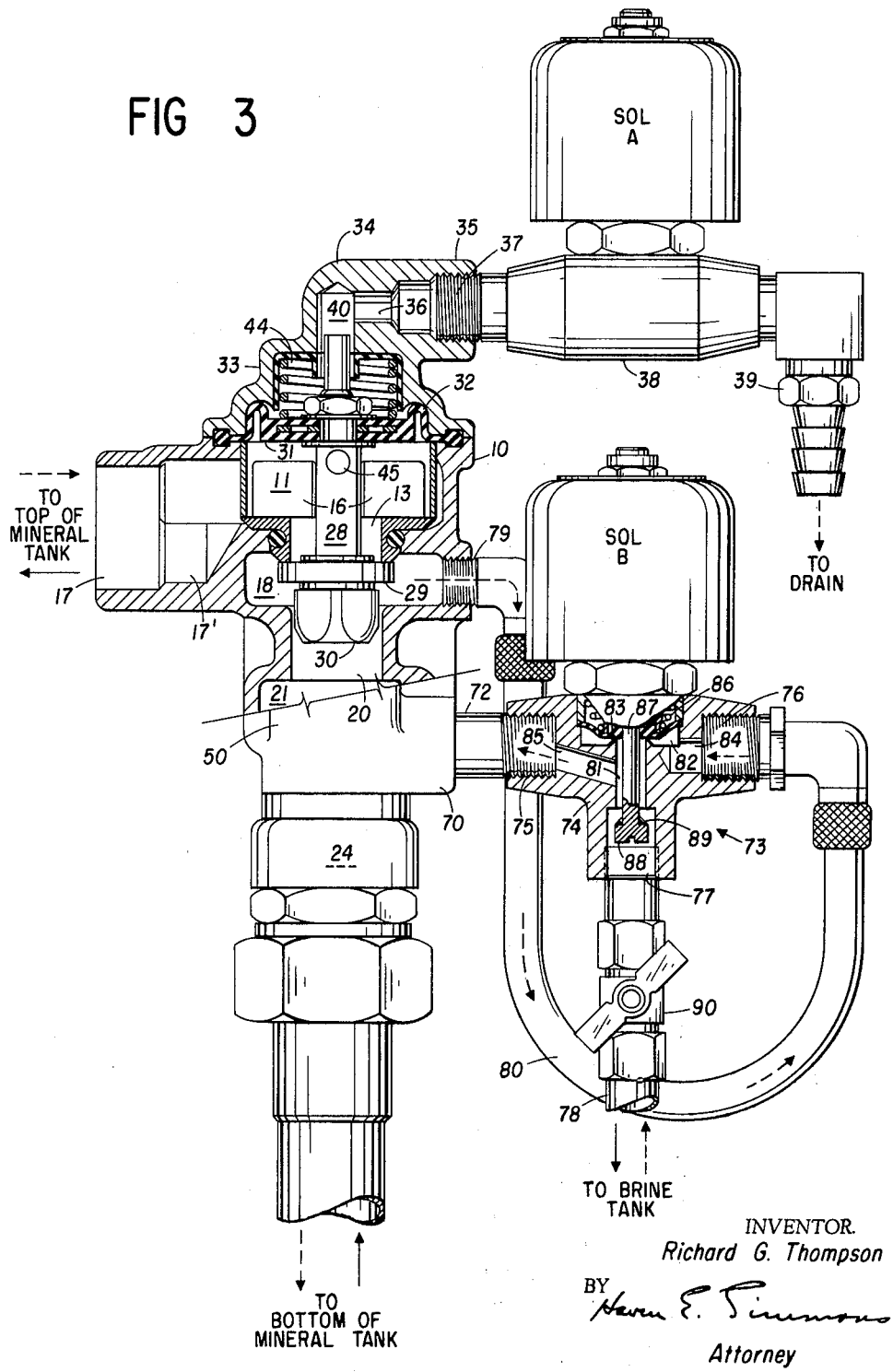

United States Patent Office 3,225,789
Patented Dec. 28, 1965

3,225,789
WATER SOFTENER VALVE
Richard G. Thompson, Stillwater, Minn. (% National Soft Water Company, 310 E. Prentiss St., Iowa City, Iowa)
Filed Nov. 13, 1962, Ser. No. 237,039
9 Claims. (Cl. 137—599.1)

The present invention relates to control valves of the type utilized in water treatment apparatus, particularly water softening apparatus, and more specifically concerns novel improvements in their regenerative and fast rinse operations.

While not limited thereto, the invention is most directly concerned with such valves for use in household water softening equipment. The latter is a well known art and essentially, though many different variations thereof exist, comprises passing the hard or untreated water through a bed of a suitable softening agent, generally a zeolite. Means are usually provided to regenerate the latter by passing a brine solution therethrough followed by a rinse with untreated water in order to flush away excess brine and the calcium or magnesium ions removed from the untreated water during the prior softening cycle. In a typical household installation, the zeolite is contained in a treatment or mineral tank into which untreated water is piped and from which the softened water flows to service. A second tank contains a brine solution and usually a float mechanism or equivalent control by means of which the quantity of brine withdrawn for a particular regenerative cycle is governed. A control valve is customarily provided, to which the mineral and brine tanks, as well as the hard water and service supply lines, are connected and by which the flow paths are altered from those for the softening cycle to those for the brining and rinse cycles. Such a valve may be wholly manually operated, or semi-automatic or fully automatic in operation, in the latter cases a timing mechanism being usually provided to actuate, partially or wholly, a shift of the valve to its regenerative and rinse positions after predetermined period of normal operation. It is with the fully automatic type of such valves that the present invention is chiefly concerned though features of it are equally adaptable to valves of the manual or semi-automatic type.

Control valves of the type to which the invention relates customarily use an injector assembly by which the brine is drawn from the brine tank and passed through the mineral tank during the regenerative period. For this purpose the incoming untreated water is diverted from its normal path through the valve and directed through the injector assembly in order to create the necessary vacuum to bring the brine solution up from its tank. In many cases a separate, fast rinse cycle after brining, and sometimes before as well, is desirable. However, if the passage through the injector assembly is also utilized for the passage of the rinse water, the restriction, particularly that owing to the nozzle of the injector, is so great that it is impossible to achieve a flow rate of water sufficient to provide a fast rinse. In order to overcome this difficulty some valves are provided with an additional passage bypassing the injector and controlled by a valve which, when the brine cycle has ceased, opens, thus increasing the flow for a fast rinse. However, this arrangement has one drawback. As a result of the opening of the bypass passage, substantially full line pressure is present in the mineral tank during the rinse, inasmuch as the fast rinse flow control device is customarily placed downstream of the mineral tank. It is advantageous for rinsing purposes that there be a pressure drop upstream of the mineral tank so that air and other gases trapped in the incoming hard water are released to act to expand the mineral bed, resulting in a fuller and more satisfactory rinse thereof, especially when the direction of the rinse water through the mineral tank is the reverse of that of the hard water during normal service. In order to achieve this function, the present invention utilizes the throat portion of the injector also as the fast rinse flow control in order to produce a suitable pressure drop upstream of the mineral tank. For this purpose, the downstream end of the fast rinse bypass is reintroduced between the nozzle and the throat of the injector, instead of downstream of the throat as is current practice, whereby the throat performs both as a portion of the injector during brining and as a flow control during fast rinse.

An additonal feature of the foregoing arrangement is the use of a constant flow control device in place of the normal fixed throat in the injector. Such a device is well known and presently manufactured by the Dole Valve Company of Morton Grove, Illinois. Essentially, it takes the form of a resilient, annular member whose upstream face is presented to the pressure of the fluid thereon and is shaped so that should the pressure upon the upstream face increase above a predetermined amount the member deflects, constricting the passage therethrough and retarding the flow, or, on the other hand, should the pressure on the upstream face decrease the member flexes to decrease its constriction and thus increase the rate of flow. Such a control device, therefore, not only affords a constant predetermined rate of flow for rinse purposes but also functions as the throat of the injector.

Moreover, introduction of the fast rinse water between the nozzle and throat provides for an additional feature of the present invention, namely, closure of the brine line during fast rinse so that no hard water can enter the brine line for the purposes of brine makeup, but only soft water during normal operation. The use of soft water only for brine makeup purposes results in a much cleaner brine tank, particularly its control or float mechanism which, when hard water is used, often becomes fouled owing to oxidized iron and turbidity which is present in the brine makeup water when untreated. To close the brine line during rinsing advantage is taken of the fact that both the brine and the rinse water may be injected by the same passage inasmuch as in the present invention the latter also enters between the nozzle and throat. Accordingly, a three-way valve is employed in the fast rinse bypass into which the brine line as well as the upstream portion of the fast rinse bypass is led. A solenoid operated plunger is arranged to provide both the valve in the fast rinse bypass and a valve in the brine line, the latter being open when the former is closed, and vice versa. Both the brine and alternately the rinse water leave the valve through a common passageway for introduction into the suction chamber between the injector nozzle and throat. Of course, in those cases where the fast rinse water is introduced downstream of the throat, so that it and the brine require separate inlet passages, a solenoid valve having a similar arrangement could be employed though an additional outlet passage from the valve would be necessary.

Finally, the present invention provides an offset brine injection passage. In most valves of the type with which the present invention is concerned, the flow of untreated water through the injector is usually in a downwards direction, the brine, of course, being injected into the suction chamber formed between the nozzle and the throat. The flow through the injector is downward in order to avoid additional passages which would usually be necessary were the flow in some other direction. However, air is often released from the water flowing through the injector owing particularly to the pressure drop caused by the nozzle. Such air sometimes becomes trapped against the ceiling of the suction chamber and can under certain circumstances severely if not totally interrupt the flow of brine being injected therein. The present valve avoids this hazard by off-setting the brine inlet passage with respect to the axis of the suction chamber; preferably the brine inlet passage enters the chamber tangentially thereof rather than radially as is current practice. The offset or tangential line taken by the incoming brine, in conjunction with the cylindrical nature of the suction chamber itself, produces a swirling action which picks up any trapped air and sweeps it away down the throat, thus preventing any chance of interruption of the brine flow.

Accordingly, an object of the present invention is the provision of a valve of the kind described having a fast rinse passage bypassing the injector nozzle and introducing the fast rinse water between the nozzle and the injector throat in order that the latter may act as a flow control therefor.

Another object of the present invention is the provision of a valve of the kind described having a passage bypassing the injector nozzle to provide an increased flow for fast rinse, the downstream end of the fast rinse bypass being introduced between the injector nozzle and throat, the latter being a resilient constant flow device acting both as the throat of the injector and as a flow control providing a constant rate of flow of fast rinse water.

A further object of the present invention is to provide a valve of the kind described in which the brine is injected on a line offset from the axis of the nozzle and throat of the injector.

An additional object of the present invention is to provide a valve of the kind described with a valve to control the flow of both the fast rinse water and the brine in such a manner that when the fast rinse bypass is closed the brine line is open, but that when the fast rinse valve is open the brine line is closed to access by the rinse water.

Other and further features, objects and advantages of the present invention will become apparent from the preferred form thereof hereafter described and shown in the accompanying drawings in which:

FIGURE 3 is a view, partly in section, similar to that of FIGURE 1 but taken at right angles with respect thereto, and illustrating the valve during the regenerative cycle.

GENERAL DESCRIPTION

Figure 2:
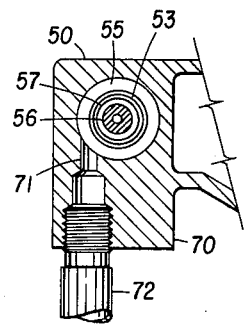
FIGURE 2 is a section taken along the line 2—2 of FIGURE 1.

In its preferred form, as shown in the accompanying drawings, the valve according to the present invention is contained essentially in a single, elongated casting or housing 10 of brass, for instance, although it could be assembled from several separate castings, or even from suitably connected pipes or other conduit material assembled in conjunction with the mineral and brine tanks. Housing 10 is provided at its upper end with a generally cylindrical chamber 11 open at its top and provided at its bottom with an axially aligned cylindrical opening into which is seated an annular bushing 12 to form a cylindrical valve port 13. The upper end of bushing 12 is flanged to form a floor 14 for chamber 11 and its outer periphery receives the lower end of a thin wall bushing 15 having portal openings 16 spaced thereabout. Portals 16, in turn, connect chamber 11 with a laterally facing untreated water outlet port 17 through passage 17'. Port 13 opens axially into a lower cylindrical inlet chamber 18 communicating with a laterally facing untreated water inlet port 19, at right angles to port 17, through passage 19'. In the floor of chamber 18 an additional cylindrical valve port 20, axially aligned with port 13, communicates with a treated water chamber 21 therebelow and the latter, in turn, with a laterally facing treated water outlet port 22, directly below port 19, through passage 22'. Port 20, chambers 11, 18 and 21, their respective ports 17, 19 and 22 and connecting passages 17', 19' and 22' are all preferably cast integrally with housing 10. The lower end of the latter is fitted with a sleeve 23 forming a vertical treated water inlet passage 24 axially aligned with ports 13 and communicating with chamber 21 thereabove through a check valve 25. The latter engages a seat on the inner end of sleeve 23 and is maintained thereon by a resilient member 26 secured in tension thereto and to a spider 27 located by a downturned shoulder in sleeve 23.

Ports 13 and 20 receive a vertical plunger 28, operable axially thereof, whose upper end extends above housing 10 and adjacent whose lower end is secured a cylindrical bib washer 29 in chamber 18. The lower and upper horizontal faces of ports 13 and 20, respectively, in chamber 18 are machined to form opposed valve seats for the opposite end faces of washer 29, the latter being sufficiently shallow so that it may alternately open and close ports 13 and 20 upon vertical movement of plunger 28. Below washer 29 the lower end of plunger 28 is provided with a plunger guide nut 30 fitting loosely within port 20. Adjacent the upper end of plunger 28, a flexible plunger operating diaphragm 31, provided with an annular fold or wrinkle 32 therein, spans the top face of chamber 11 and is fixed to plunger 28, thus closing chamber 11. Diaphragm 31 is secured to housing 10 by being clamped between it and a hollow end cap 33 provided with an upstanding, centrally located boss 34 having a laterally extending stub 35 bored to form a lateral drain passage 36 and a drain valve port 37. The latter receives the upstream end of a normally closed drain valve 38, operated by a solenoid A, and provided with a drain line fitting 39 at its downstream end. The upstream end of drain passage 36 communicates with a vertical drain chamber 40, formed integrally with boss 34, and spacedly receiving the upper end of plunger 28. The upper, inner end of cap 33 receives an inverted cup-like dielectric insulator 41, bored to receive the upper end of plunger 28, and provided with an annular lip 42 in order to form a loose fitting upper guide for plunger 28. Diaphragm 31 and cap 33 thus together form a closed plunger operating chamber 43 in which is positioned a compressible helical spring 44 surrounding the upper end of plunger 28 therein and operative between cup 41 and the upper face of diaphragm 31 in order normally to urge plunger 28 downwardly and maintain port 20 closed. The portion of plunger 28 in chamber 11 is bored radially to form a relatively small passage 45 which opens in turn into the lower end of a relatively larger passage 46 axially bored in the upper end of plunger 28, thus providing communication between chambers 11 and 43, and between the former and chamber 40 through the space between the upper end of plunger 28 and lip 42.

Housing 10 is additionally provided with an integral, generally rectangular injector boss 50 inclined upwardly from the region of chamber 21 on the opposite side of housing 10 from ports 19 and 22. Boss 50 is longitudinally bored to provide an inclined passage 51 which in turn opens into a lateral passage 52 communicating with chamber 24 through the walls of sleeve 23. A first counterbore above passage 51 receives a cylindrical injector nozzle 54 threaded into the upper end of the second counterbore in boss 50. The lower end of nozzle 54 is spaced from the upper end of throat 53 in order to provide a cylindrical suction chamber 55 and is formed with an integral, concentric retaining boss 56 provided to locate a stiff helical spring 57 operative between the opposed faces of throat 53 and nozzle 54 to maintain the former in position during periods of vacuum in chamber 55. Nozzle 54 is axially bored to provide a nozzle passage 58 tapering down to an orifice at it lower end opening through boss 56 into chamber 55 and of substantially less diameter than throat 53, the upper end of nozzle passage 58 being closed by a suitable end plug 59 threaded therein. Nozzle 54 intermediate its end is diametrically bored to provide a pair of nozzle inlets 60, perpendicular to each other, which are circumvented in turn by a cylindrical filter screen 61 in order to bar any foreign matter too large to pass through nozzle 54. The portion of the inner wall of boss 50 surrounding inlets 60 and screen 61 is radially relieved to form a generally annular inlet chamber 62 thereabout communicating by means of a lateral passage 63 with port 20 through the wall of the latter. Finally, boss 50 is provided with a cylindrical extension 70, extending laterally therefrom, in which is bored a brine inlet passage 71 entering suction chamber 55 so that its axis is substantially tangential to the walls of chamber 55 and in a plane normal to the axis of nozzle 54 and throat 53. In the alternate embodiment shown in FIGURE 1a, a Dole type, resilient constant flow control assembly 53', 53'' replaces the fixed injector throat 53 shown in FIGURE 1. Otherwise, the structure within boss 50 is identical.

A nipple 72 is threaded into the outer end of passage 71 on to which in turn is threaded a three-way solenoid valve 73. The latter comprises a cast, T-shaped housing 74 having opposite, laterally facing fast-rinse ports 75 and 76 and a downwardly facing brine inlet port 77. The latter is connected to a brine supply line 78 from the brine tank (not shown) and port 75 to suction chamber 55 by means of nipple 72. Port 76 is connected to a rinse outlet port 79, integral with housing 10 and communicating with chamber 18, by means of a fast rinse bypass line 80. A rectilinear pasage 81 extends upwardly from the ceiling of port 77 and opens axially through the floor of a cylindrical well 82 to form therewith a raised valve seat 83. The annular floor of well 82 about seat 83 communicates with port 76 by means of a passage 84 and passage 81 with port 75 by means of an inclined passage 85 entering passage 81 intermediate its ends. A suitable solenoid assembly B is threaded into the upper portion of well 82 and is provided with an armature operated valve washer 86 normally biased, when solenoid B is inactive, to contact seat 83 and thus close access to passages 81 and 85 by rinse water from chamber 18 through line 80. A plunger 87 extends downwardly from washer 86 axially through and spacedly from passage 81 and is provided at its lower end with an enlarged head 88, the shoulder between plunger 87 and its head 88 being fitted with a conical valve washer 89. The length of plunger 87 is such that washer 89, on the one hand, contacts the lower end of passage 81 to close off the latter from port 77 when solenoid B is energized, and, on the other hand, is held away therefrom when solenoid B is inactive. If desired a manually operated valve 90 may also be inserted in brine line 78 for convenience during servicing of the brine valve (not shown).

OPERATION

Since the interconnections of valves of the basic type of the present invention with the mineral and brine tanks are well known, it is unnecessary to illustrate or to describe them here in detail. The mineral and brine tanks themselves, and the control valve in the brine tank itself, may be of any well known, conventional construction. In any event, such tanks, as well as their interconnections, are described in many patents to which reference may be made if desired.

Figure 1:
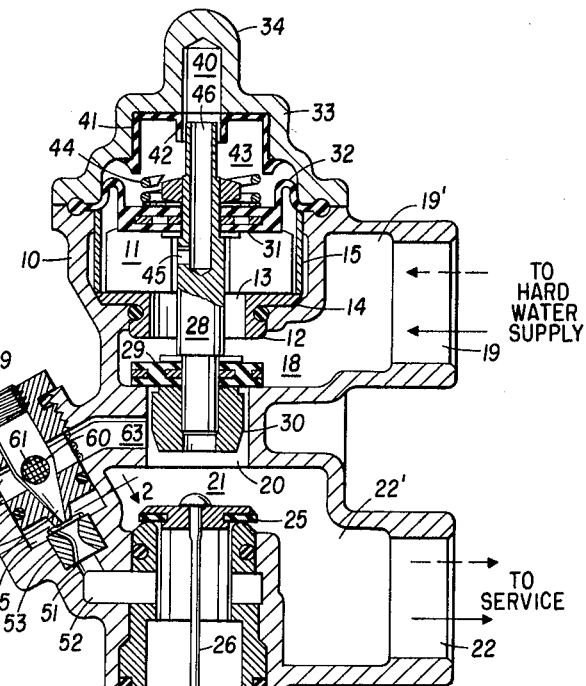
FIGURE 1 is a vertical section through a valve according to the present invention, illustrating the valve during normal service.

(a) *Normal service*: In FIGURES 1 and 3 of the drawings the solid arrows represent the direction of fluid flow during normal service and FIGURE 1 in particular illustrates the position of plunger 28 and bib washer 29 when the valve is in normal service. During this phase solenoids A and B are inactive so that drain valve 38 and the fast rinse bypass line 80 are closed and plunger 28 is biased by spring 44 to the bottom of its stroke so that bib washer 29 closes port 20. Hard or untreated water enters chamber 18 through port 19 and passage 19', passes up through port 13 into chamber 11 from whence it is carried through portals 16 and outport 17 to the distributor at the top of the mineral tank. A portion of the water in chamber 11 enters passage 45 and 46 into chamber 43 above diaphragm 31, thus equalizing the pressure on both sides of the latter so that spring 44 maintains bib washer 29 in its position closing port 20. Water passing through the mineral tank has its calcium and magnesium ions exchanged for the sodium ions of the zeolite and emerges from the bottom of the mineral tank and enters chamber 24. Its pressure forces check valve 25 upwards, thus permitting the water to flow into chamber 21 and out to port 22 through passage 22' to service. Since there is some pressure drop in the system, the pressure of the water in chamber 21 upon the lower side of bib washer 29 is less than that on it upper side in chamber 18, thus insuring that port 20 remains closed.

(b) *Regeneration*: The broken arrows in FIGURES 1 and 3 illustrate the direction of flow during the regenerative phase. A suitable timing mechanism (not shown) of any conventional nature is connected to selectively energize solenoids A and B at predetermined times for regeneration of the mineral tank. When that time, generally in the early hours of the morning, arrives, the timing mechanism first energizes solenoid A, thus opening drain valve 38. Water from chamber 11 through passages 45 and 46, and from chamber 43 between the upper end of plunger 28 and lip 42, flows into drain chamber 40 and thence to drain 39 through passage 36 and drain valve 38. The flow of water from chamber 43, and from chamber 11 through the relatively small passage 45, produces a pressure drop reducing the pressure in chamber 43 above diaphragm 31 to less than that in chamber 11, whereupon diaphragm 31 and plunger 28 are urged upwardly, compressing spring 44, until bib washer 29 closes port 13 and opens port 20. The valve is then in the position shown in FIGURE 2. Accordingly, hard water then flows from chamber 18 through port 20 into chamber 21 and also to inlet chamber 62 through passage 63. Should any water be needed for service during the period of regeneration it may still be withdrawn from port 22 which remains connected with chamber 21, though of course such water will be untreated. Water from inlet chamber 62 passes through filter screen 61 and nozzle inlets 60, then down through nozzle passage 58 and throat 53, thus creating a partial vacuum in suction chamber 55. Brine from the brine tank is accordingly drawn up brine line 78 into port 77, past valve washer 89 to passage 81 thence up passage 85 to the brine inlet passage 71 through nipple 72 and port 75. The tangential offset of brine inlet passage 71 produces a swirling action in suction chamber 55 which sweeps with it and carries away through throat 53 any air which may have been released from the water emerging from nozzle 54 owing to the large pressure drop caused thereby. There is thus no danger of a partial or total interruption of the brine flow owing to such trapped air in chamber 55. The mixture of brine and water emerges from throat 53 and is carried by passage 51 and 52 to chamber 24, whence it is carried to the bottom of the mineral tank and flows upwardly therethrough to exchange its sodium ions for the now calcium and magnesium ions of the zeolite. The mixture of hard water and the effluvient brine emerges from the top of the mineral tank and enters chamber 11 through port 17 and its connecting passageway 17'. From chamber 11 the waste water flows to drain 39 by means of passages 45, 46, chamber 40, passage 36 and drain valve 38.

(c) *Fast Rinse*: The flow path through the valve during fast rinse is also indicated by the broken arrows in FIGURES 1 and 3, and the position of bib washer 29 is also that shown in FIGURE 3. After a predetermined amount of brine has been withdrawn from the brine tank, the brine valve therein closes thus shutting off the supply of brine to suction chamber 55. Approximately 45 minutes thereafter solenoid B is energized by the timing mechanism, thus raising washer 86 and opening the fast rinse line 80. At the same time the raising of washer 86 off its seat 83 by solenoid B causes washer 89 to contact the lower end of passage 81, thus shutting off communication between the brine tank and suction chamber 55. Hard water then flows from chamber 18 through port 79, fast rinse line 78, port 76, passage 84, well 82, passages 81 and 85, into suction chamber 55 through inlet passage 71, nipple 72 and port 75, thus bypassing nozzle 57. The flow through throat 53 to chamber 24 and up through the mineral tank is accordingly increased over that during the regenerative cycle. The closure of the brine line insures that no hard water can enter the brine tank during the fast rinse cycle. The constriction afforded by throat 53 is of course less than that of nozzle 54, on the one hand, but is sufficient, on the other hand, to cause a pressure drop in the fast rinse water between suction chamber 55 and the mineral tank. Accordingly, the rate of flow through the latter is restrained so that the mineral therein is not violently agitated or disturbed. At the same time, since full line pressure is thus not present in the mineral tank, air trapped in the water above throat 53 is released therefrom, owing to the pressure drop caused by throat 53, to produce a controlled expansion of the mineral bed for increased fast rinse efficiency. In this way, therefore, throat 53 serves both as a portion of the injector assembly and as a fast rinse flow control upstream of the mineral tank with the advantages enumerated.

Figure 1A:
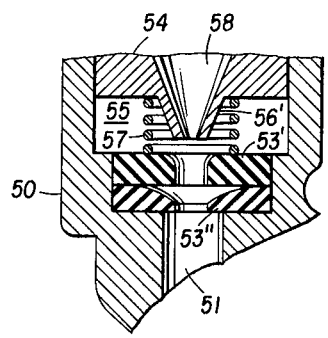
FIGURE 1a illustrates an enlarged view of a modified construction of a portion of the valve shown in FIGURE 1.

Operation of the embodiment shown in FIGURE 1a is very similar. In that case, the resilient flow control assembly 53', 53" acts as the throat portion of the injector in exactly the same manner as throat 53. During fast rinse however, its resilient nature and construction permit it to maintain a constant flow rate of fast rinse water despite varying pressure in chamber 55 owing in turn to any variation in pressure of the hard water supply entering port 19.

After a predetermined period of fast rinse solenoids A and B are deactivated, thus closing drain valve 38 and fast rinse line 80 and restoring communication between the brine tank and suction chamber 55. The closing of drain valve 38 causes pressure to build up in chambers 11 and 43 on each side of diaphragm 31 and in the mineral tank until it equals that in chamber 18, whereupon spring 44 acts to move diaphragm 31 and plunger 28 downwardly to open port 13 and close port 20, thus returning the valve and flow through the mineral tank to normal service. During the initial portion of the latter, soft water entering chamber 24 from the bottom of the mineral tanks also passes into chamber 55 through passages 51 and 52 and throat 53, whence it flows out through passage 71, past washer 89 and into brine line 78 through port 77 in order to refill the brine tank for purposes of brine make-up.

While the present invention has been described with reference to particular embodiments and detailed descriptive language has been used, it is not so limited. Instead, the following claims are to be read as encompassing such modifications and adaptations of the invention as would ordinarily occur to one in the art.

I claim:

1. In a fluid treatment control assembly, said assembly having an untreated fluid inlet passage, an untreated fluid outlet passage communicable with said inlet passage, a treated fluid passage, an injector passage communicable at its upstream end with said untreated inlet passage and at its downstream end with said treated fluid passage, first valve means operable to one position to permit flow of fluid from said untreated inlet passage to said untreated outlet passage and prevent flow from said untreated inlet passage to said injector passage and to a second position to permit flow of fluid from said untreated inlet passage to said injector passage and prevent flow from said untreated inlet passage to said untreated outlet passage, an injector including a nozzle and a throat, said injector being operatively mounted in said injector passage to form a suction chamber between said nozzle and throat when fluid flows from said untreated inlet passage through said injector to said treated fluid passage, and a regenerative fluid inlet passage operatively communicating with said chamber, the combination therewith of a fast rinse fluid passage communicable at its upstream end with said untreated inlet passage and at its downstream end with said chamber effective to bypass said nozzle, said throat having a constriction less than that of said nozzle but sufficient to cause a predetermined pressure drop in fluid flowing from said fast rinse passage to said treated fluid passage whereby said throat controls the rate of flow of rinse fluid in said treated fluid passage, and second valve means normally closing said fast rinse passage.

2. The device of claim 1 wherein said throat is in the form of a resilient flow control device having a fluid flow passage therethrough and an upstream face around said flow passage transversely presented to the path of fluid flow in said injector passage, the constriction of said flow passage resiliently decreasing or increasing in response to respectively a decrease or increase in fluid pressure upon said face in order to maintain a constant rate of fast rinse fluid flow through said flow passage and in said treated fluid passage.

3. The device of claim 1 wherein said chamber is provided with a generally cylindrical wall between said nozzle and throat and wherein the direction of said regenerative fluid passage at its opening into said chamber is both in a plane substantially normal to this axis of said nozzle and throat and off-set with respect to said axis.

4. The device of claim 3 wherein the direction of said regenerative fluid passage at its opening into said chamber is substantially tangential to the intersection of said wall with said plane.

5. The device of claim 1 wherein a third valve means is interposed in said regenerative fluid passage and operatively associated with said first and second valve means so that said third valve means is closed and alone effective to prevent passage of untreated fluid through said regenerative fluid passage only when said second valve means is open and said first valve means is in its second position.

6. The device of claim 5 wherein said third valve means comprises a casing having fast rinse fluid inlet and outlet ports, said inlet port being communicable with said untreated inlet passage and said outlet port communicating with said chamber, a first valve closure means normally blocking flow between said inlet and outlet ports, a regenerative fluid inlet port communicating with said outlet port downstream of said first valve closure means, and a second valve closure means between said regenerative inlet port and said outlet port normally permitting flow of regenerative fluid therebetween, said second closure means being operatively connected to said first closure means and operable to block flow of regenerative fluid between said regenerative inlet port and said outlet port when said first closure means is operable to permit flow of rinse fluid between said inlet and outlet ports.

7. The device of claim 6 wherein said first closure means includes a first valve seat and a valve plunger reciprocally movable to operatively engage or disengage said seat, and wherein said second closure means includes a second valve seat and a longitudinal extension of said plunger reciprocally movable therewith to operatively engage or disengage said second seat when said first seat is respectively disengaged or engaged by said first closure means.

8. The device of claim 7 wherein means are provided to bias said plunger and extension to cause said first and second closure means normally to engage said first and disengage said second seats, respectively, and wherein electromagnetic means are provided operable upon activation to move said plunger and extension to cause said first and second closure means to disengage said first and engage said second seats, respectively.

9. In a fluid treatment control assembly, said assembly having an untreated fluid inlet passage, an untreated fluid outlet passage communicable with said inlet passage, a treated fluid passage, an injector passage communicable at its upstream end with said untreated inlet passage and at its donwstream end with said treated fluid passage, first valve means operable to one position to permit flow of fluid from said untreated inlet passage to said untreated outlet passage and prevent flow from said untreated inlet passage to said injector passage and to a second position to permit flow of fluid from said untreated inlet passage to said injector passage and prevent flow from said untreated inlet passage to said untreated outlet passage, an injector including a nozzle and a throat, said injector being operatively mounted in said injector passage to form a suction chamber between said nozzle and throat when fluid flows from said untreated inlet passage through said injector to said treated fluid passage, and a regenerative fluid passage operatively communicating with said chamber, the combination therewith of a fast rinse fluid passage communicable at its upstream end with said untreated inlet passage and at its downstream end with said treated fluid passage effective to by-pass said nozzle, second valve means normally closing said fast rinse passage, and third valve means in said regenerative fluid passage and operatively associated with said first and second valve means so that said third valve means is closed and alone effective to prevent passage of untreated fluid through said regenerative fluid passage only when said second valve means is open and said first valve means is in its second position.

References Cited by the Examiner
UNITED STATES PATENTS

| | | | |
|---|---|---|---|
| 2,361,150 | 10/1944 | Petroe | 137—604 XR |
| 2,714,897 | 8/1955 | Whitlock | 137—604 XR |
| 2,874,719 | 2/1959 | Van Tuyl | 137—604 |
| 2,935,092 | 5/1960 | Stoner | 137—599.1 XR |
| 3,007,495 | 11/1961 | Whitlock | 137—604 XR |

ISADOR WEIL, *Primary Examiner.*

WILLIAM F. O'DEA, *Examiner.*